(12) United States Patent
Nihey

(10) Patent No.: US 11,485,640 B2
(45) Date of Patent: Nov. 1, 2022

(54) SINGLE-WALLED CARBON NANOTUBE SEPARATION APPARATUS AND SINGLE-WALLED CARBON NANOTUBE SEPARATION METHOD

(71) Applicant: NEC CORPORATION, Tokyo (JP)

(72) Inventor: Fumiyuki Nihey, Tokyo (JP)

(73) Assignee: NEC CORPORATION, Tokyo (JP)

( * ) Notice: Subject to any disclaimer, the term of this patent is extended or adjusted under 35 U.S.C. 154(b) by 566 days.

(21) Appl. No.: 16/484,229

(22) PCT Filed: Feb. 28, 2017

(86) PCT No.: PCT/JP2017/007816
§ 371 (c)(1),
(2) Date: Aug. 7, 2019

(87) PCT Pub. No.: WO2018/158826
PCT Pub. Date: Sep. 7, 2018

(65) Prior Publication Data
US 2020/0031672 A1   Jan. 30, 2020

(51) Int. Cl.
*C01B 32/172* (2017.01)
*C01B 32/152* (2017.01)
*B01D 57/02* (2006.01)

(52) U.S. Cl.
CPC ............ *C01B 32/172* (2017.08); *B01D 57/02* (2013.01); *C01B 32/152* (2017.08)

(58) Field of Classification Search
CPC ... C01B 32/172; C01B 32/152; C01B 32/159; C01B 2202/02; C01B 32/158; C01B 32/16; C01B 32/162; C01B 32/164; C01B 32/166; C01B 32/168; C01B 32/17; C01B 32/174; C01B 32/176; C01B 32/178; C01B 2202/00; C01B 2202/04; C01B 2202/06; C01B 2202/08; C01B 2202/10;
(Continued)

(56) References Cited

U.S. PATENT DOCUMENTS

| 7,867,468 B1* | 1/2011 | Haddon | B82Y 40/00 977/720 |
| 2008/0213159 A1* | 9/2008 | Sandhu | B82Y 40/00 977/845 |

FOREIGN PATENT DOCUMENTS

| JP | 2005-527455 A | 9/2005 |
| JP | 2008-055375 A | 3/2008 |

(Continued)

OTHER PUBLICATIONS

Ralph Krupke, et al., "Thin Films of Metallic Carbon Nanotubes Prepared by Dielectrophoresis", Advanced Materials, 2006, pp. 1468-1470, vol. 18.
(Continued)

*Primary Examiner* — Daniel C. McCracken
(74) *Attorney, Agent, or Firm* — Sughrue Mion, PLLC

(57) ABSTRACT

A single-walled carbon nanotube separation apparatus includes: a separation tank accommodating a single-walled carbon nanotube dispersion liquid containing: metallic single-walled carbon nanotubes; and semiconducting single-walled carbon nanotubes; a first electrode and a second electrode that are installed in the separation tank; and a partition wall installed between the first electrode and the second electrode in the separation tank and below the separation tank in a height direction thereof.

6 Claims, 4 Drawing Sheets

(58) Field of Classification Search
CPC ............ C01B 2202/20; C01B 2202/22; C01B 2202/24; C01B 2202/26; C01B 2202/28; C01B 2202/30; C01B 2202/32; C01B 2202/34; C01B 2202/36; B01D 57/02; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

FOREIGN PATENT DOCUMENTS

| JP | 2008-266112 A | 11/2008 |
|----|---------------|---------|
| JP | 2008-285386 A | 11/2008 |
| JP | 2008-285387 A | 11/2008 |
| JP | 2011-168417 A | 9/2011 |
| JP | 5177624 B2 | 4/2013 |
| WO | 2006013788 A1 | 2/2006 |
| WO | 2008143281 A1 | 11/2008 |
| WO | 2010/150808 A1 | 12/2010 |
| WO | 2011/102322 A1 | 8/2011 |

OTHER PUBLICATIONS

Michael S. Arnold, et al., "Sorting carbon nanotubes by electronic structure using density differentiation", Nature Nanotechnology, Oct. 2006, pp. 60-65, vol. 1.

Takeshi Tanaka, et al., Simple and Scalable Gel-Based Separation of Metallic and Semiconducting Carbon Nanotubes, Nano Letters, 2009, pp. 1497-1500, vol. 9, No. 4.

Notice of Allowance issued from Japanese Patent Application No. 2017-529101 dated Jul. 18, 2017.

International Search Report for PCT/JP2017/007816 dated Apr. 11, 2017 (PCT/ISA/210).

\* cited by examiner

SINGLE-WALLED CARBON NANOTUBE SEPARATION APPARATUS AND SINGLE-WALLED CARBON NANOTUBE SEPARATION METHOD

CROSS REFERENCE TO RELATED APPLICATIONS

This application is a National Stage of International Application No. PCT/JP2017/007816 filed Feb. 28, 2017, the disclosure of which is incorporated herein in its entirety by reference.

TECHNICAL FIELD

The present invention relates to a single-walled carbon nanotube separation apparatus and a single-walled carbon nanotube separation method.

BACKGROUND ART

In recent years, nanocarbon materials which are carbon materials having a nanometer size structure such as fullerene, carbon nanotubes, and graphene have attracted attention. Among these, carbon nanotubes particularly have attracted attention because carbon nanotubes exhibit electrically and mechanically unique properties.

Carbon nanotubes have a structure in which a uniform planar graphene sheet is rolled into a cylindrical shape. Among carbon nanotubes, carbon nanotubes constituted of a single cylinder are referred to as single-walled carbon nanotubes. On the other hand, among carbon nanotubes, carbon nanotubes constituted of a plurality of cylinders coaxially overlapping each other are referred to as multi-walled carbon nanotubes. Single-walled carbon nanotubes are extremely thin in the order of nanometers in diameter so that quantum size effects appear prominently.

Single-walled carbon nanotubes are classified into metallic single-walled carbon nanotubes exhibiting metallic properties and semiconducting single-walled carbon nanotubes exhibiting semiconducting properties in accordance with differences in a winding manner (chirality) of a cylinder.

Semiconducting single-walled carbon nanotubes can modulate electrical conductivity from outside using an electric field effect and a doping effect. Furthermore, semiconducting single-walled carbon nanotubes can be used as a semiconductor ink by dispersing semiconducting single-walled carbon nanotubes in a dispersion medium. For this reason, it is expected that will be application of semiconducting single-walled carbon nanotubes in thin film transistors and sensors that can be manufactured by printing and coating processes.

However, in current methods of synthesizing single-walled carbon nanotubes, the selective formation of metallic single-walled carbon nanotubes and semiconducting single-walled carbon nanotubes are not realized. That is to say, single-walled carbon nanotubes obtained using the current methods of synthesizing single-walled carbon nanotubes are a mixture of metallic single-walled carbon nanotubes and semiconducting single-walled carbon nanotubes. Therefore, in order to apply single-walled carbon nanotubes to the field of electronics, a separation technique of synthesizing single-walled carbon nanotubes and then separating metallic single-walled carbon nanotubes and semiconducting single-walled carbon nanotubes is required.

In order to solve such problems, a method of separating metallic single-walled carbon nanotubes and semiconducting single-walled carbon nanotubes has been proposed.

Examples of a method of separating metallic single-walled carbon nanotubes and semiconducting single-walled carbon nanotubes include a separating method using direct current electrophoresis (for example, refer to Patent Document 1), a method of separating metallic single-walled carbon nanotubes using a dielectrophoresis method (for example, refer to Non-Patent Document 1), a separating method using density gradient centrifugation (for example, refer to Non-Patent Document 2), a separating method using ion adsorption chromatography using DNA wrapping (for example, refer to Non-Patent Document 3), a separating method using gel electrophoresis (for example, refer to Patent Document 2), a method of separating metallic/semiconducting single-walled carbon nanotubes using adsorption to a gel, a method of separating metallic/semiconducting single-walled carbon nanotubes using a carrier-free electrophoresis method (for example, refer to Patent Document 3), and the like.

PRIOR ART DOCUMENTS

Patent Documents

[Patent Document 1] Japanese Unexamined Patent Application, First Publication No. 2008-55375
[Patent Document 2] Japanese Patent No. 5177624 [Patent Document 3] Japanese Unexamined Patent Application, First Publication No. 2011-168417

Non-Patent Document

[Non-Patent Document 1] R. Krupke et al., Advanced Materials, vol. 18, pp. 1468 to 1470 (2006)
[Non-Patent Document 2] M. S. Arnold et al., Nature Nanotechnology, vol. 1, pp. 60 to 65 (2006)
[Non-Patent Document 3] T. Tanaka et al., Nano Letters, vol. 9, pp. 1497 to 1500 (2009)

SUMMARY OF THE INVENTION

Problem to be Solved by the Invention

The method of separating metallic/semiconducting single-walled carbon nanotubes using the above-mentioned carrier-free electrophoresis method includes separating metallic single-walled carbon nanotubes and semiconducting single-walled carbon nanotubes using a non-ionic surfactant as a surfactant. For this reason, it is known that it is hard for metallic single-walled carbon nanotubes and semiconducting single-walled carbon nanotubes separated using this method to cause deterioration in the characteristics of electronic devices when applied to electronic devices. Therefore, a method of separating single-walled carbon nanotubes using a carrier-free electrophoresis method is a method appropriately used for separation and purification of single-walled carbon nanotubes used as an electronic device material. However, since this separation method uses a carrier-free electrophoresis method, when a convection phenomenon occurs in a separation tank, there is a problem that single-walled carbon nanotubes are agitated and it becomes difficult to separate metallic single-walled carbon nanotubes and semiconducting single-walled carbon nanotubes.

The present invention was made in view of the above-mentioned circumstances, and an object of the present invention is to provide a single-walled carbon nanotube separation apparatus and a single-walled carbon nanotube separation method capable of stably separating metallic single-walled carbon nanotubes and semiconducting single-walled carbon nanotubes by minimizing the occurrence of a convection phenomenon in a dispersion liquid containing single-walled carbon nanotubes in a separation tank.

Means for Solving the Problem

A single-walled carbon nanotube separation apparatus of the present invention includes: a separation tank accommodating a single-walled carbon nanotube dispersion liquid containing: metallic single-walled carbon nanotubes; and semiconducting single-walled carbon nanotubes; a first electrode and a second electrode that are installed in the separation tank; and a partition wall installed between the first electrode and the second electrode in the separation tank and below the separation tank in a height direction thereof.

Effect of the Invention

According to the present invention, in a separation tank, it is possible to minimize the occurrence of a convection phenomenon in a dispersion liquid containing single-walled carbon nanotubes and to stably separate metallic single-walled carbon nanotubes and semiconducting single-walled carbon nanotubes.

EMBODIMENTS FOR CARRYING OUT THE INVENTION

An embodiment of a single-walled carbon nanotube separation apparatus and a single-walled carbon nanotube separation method of the present invention will be described.

Note that an embodiment is specifically described for better understanding of the spirit of the invention and does not limit the present invention unless otherwise stated.

Figure 1:
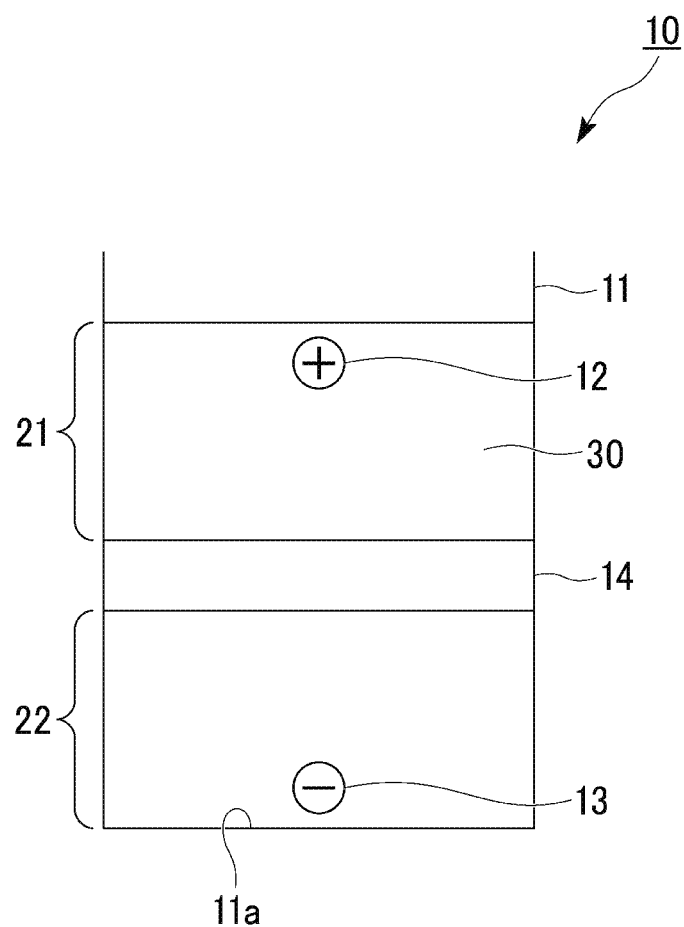
FIG. 1 is a schematic diagram showing a single-walled carbon nanotube separation apparatus according to a first exemplary embodiment.

First Exemplary Embodiment (Single-Walled Carbon Nanotube Separation Apparatus)
FIG. 1 is a schematic diagram showing a single-walled carbon nanotube separation apparatus according to this embodiment.

A single-walled carbon nanotube separation apparatus 10 in this embodiment includes a separation tank 11 which accommodates a single-walled carbon nanotube dispersion liquid 30 containing metallic single-walled carbon nanotubes and semiconducting single-walled carbon nanotubes, a first electrode 12 and a second electrode 13 that are installed in the separation tank 11, and a partition wall 14 installed between the first electrode 12 and the second electrode 13 in the separation tank 11 and below the separation tank 11 in a height direction thereof.

The first electrode 12 is disposed at an upper portion in the separation tank 11 in a height direction thereof (a region in the separation tank 11 above half the height thereof and a region on a side opposite to a bottom surface 11a of the separation tank 11).

The second electrode 13 is disposed at a lower portion in the separation tank 11 in the height direction thereof (a region in the separation tank 11 below half the height thereof and a region of the separation tank 11 on the bottom surface 11a side).

In the single-walled carbon nanotube separation apparatus 10 in this embodiment, for example, the first electrode 12 is a positive electrode and the second electrode 13 is a negative electrode.

The partition wall 14 is provided in a region between the first electrode 12 and the second electrode 13 in the separation tank 11 and below half a height of the separation tank 11 (a region of the separation tank 11 on the bottom surface 11a side). The inside of the separation tank 11 is partitioned into a first region 21 (a region in the separation tank 11 above half the height thereof) having the first electrode 12 installed therein and a second region 22 (a region in the separation tank 11 below half the height thereof) having the second electrode 13 therein by the partition wall 14.

A shape and a size of the separation tank 11 are not particularly limited as long as the separation tank 11 can accommodate the single-walled carbon nanotube dispersion liquid 30.

A material of the separation tank 11 is not particularly limited as long as the material is stable with respect to the single-walled carbon nanotube dispersion liquid 30 and examples of the material include glass, an acrylic resin, and the like.

The first electrode 12 and the second electrode 13 are not particularly limited as long as the electrode can be used for carrier-free electrophoresis and is stable with respect to the single-walled carbon nanotube dispersion liquid 30. Examples of the first electrode 12 and the second electrode 13 include a platinum electrode and the like.

The partition wall 14 is not particularly limited as long as metallic single-walled carbon nanotubes and semiconducting single-walled carbon nanotubes included in the single-walled carbon nanotube dispersion liquid 30 can pass through the partition wall. Examples of the partition wall 14 include a glass filter, a metal mesh, and the like. A hole diameter (a pore size) of the partition wall 14 is not particularly limited as long as metallic single-walled carbon nanotubes and semiconducting single-walled carbon nanotubes included in the single-walled carbon nanotube dispersion liquid 30 can pass through the partition wall 14.

(Single-Walled Carbon Nanotube Separation Method)
Referring to FIG. 1, a single-walled carbon nanotube separation method using the single-walled carbon nanotube separation apparatus 10 will be described and an action of the single-walled carbon nanotube separation apparatus 10 will be described.

In the single-walled carbon nanotube separation apparatus 10 in this embodiment, the single-walled carbon nanotube dispersion liquid 30 to be treated is a dispersion liquid dispersed a mixture of metallic single-walled carbon nanotubes and semiconducting single-walled carbon nanotubes (hereinafter referred to as a "single-walled carbon nanotube mixture") in a dispersion medium containing a surfactant.

A dispersion medium of the single-walled carbon nanotube dispersion liquid 30 is not particularly as long as the single-walled carbon nanotube mixture can be dispersed. Examples of the dispersion medium include water, heavy water, an organic solvent, and the like. Among these dispersion media, water or heavy water is preferably used because the single-walled carbon nanotubes are not degraded.

Examples of a surfactant include a non-ionic surfactant, a cationic surfactant, an anionic surfactant, and the like. In order to prevent ionic impurities such as sodium ions from mixing into single-walled carbon nanotubes, it is desirable to use a non-ionic surfactant.

A method of preparing the single-walled carbon nanotube dispersion liquid 30 is not particularly limited and known methods is used. A method of dispersing the single-walled carbon nanotube mixture in the dispersion medium by performing ultrasonic treatment on a liquid mixture of the single-walled carbon nanotube mixture and the dispersion medium containing a surfactant is an exemplary example. Through this ultrasonic treatment, the mixture of metallic single-walled carbon nanotubes and semiconducting single-walled carbon nanotubes which have been aggregated is sufficiently separated and the single-walled carbon nanotube dispersion liquid 30 is obtained by uniformly dispersing metallic single-walled carbon nanotubes and semiconducting single-walled carbon nanotubes in the dispersion medium. Therefore, the metallic single-walled carbon nanotubes and the semiconducting single-walled carbon nanotubes can be easily separated by a carrier-free electrophoresis method which will be described later. It should be noted that metallic single-walled carbon nanotubes and semiconducting single-walled carbon nanotubes which are not dispersed by ultrasonic treatment are preferably separated out and removed by ultracentrifugation.

The single-walled carbon nanotube dispersion liquid 30 obtained as described above is accommodated in the separation tank 11.

Subsequently, metallic single-walled carbon nanotubes and semiconducting single-walled carbon nanotubes contained in the single-walled carbon nanotube dispersion liquid 30 are separated from each other using a carrier-free electrophoresis method. To be more specific, metallic single-walled carbon nanotubes having a positive charge as a whole are drawn to the second electrode 13 (a negative electrode) side by applying a direct current (DC) voltage to the first electrode 12 and the second electrode 13 for a predetermined time (for example, 1 hour to 24 hours). At this time, semiconducting single-walled carbon nanotubes having a very weak overall electrical charge are not drawn to the second electrode 13 side. Therefore, the single-walled carbon nanotube dispersion liquid 30 is separated into two phases, i.e., a metallic single-walled carbon nanotube-containing dispersion liquid phase having a relatively high content of metallic single-walled carbon nanotubes (hereinafter referred to as a "dispersion liquid phase A") and a semiconducting single-walled carbon nanotube-containing dispersion liquid phase having a relatively high content of semiconducting single-walled carbon nanotubes (hereinafter referred to as a "dispersion liquid phase B"). In this embodiment, the dispersion liquid phase A is formed in the second region 22 below half the height of the separation tank 11 via the partition wall 14 and the dispersion liquid phase B is formed in the first region 21 above half the height of the separation tank 11 via the partition wall 14.

A voltage applied to the first electrode 12 and the second electrode 13 is not particularly limited and is appropriately adjusted in accordance with a distance between the first electrode 12 and the second electrode 13, a content of the single-walled carbon nanotube mixture in the single-walled carbon nanotube dispersion liquid 30, and the like.

Subsequently, each of the dispersion liquid phase A and the dispersion liquid phase B which have been separated is fractionated.

A method of fractionating is not particularly limited and may be any method as long as the dispersion liquid phase A and the dispersion liquid phase B do not diffuse and mix into each other due to the method.

Examples of the method of fractionating include a method of stopping the application of a voltage to the first electrode 12 and the second electrode 13 and gently performing suctioning from each phase using a pipette little by little.

Also, examples of a method of fractionating include a method of installing a suction port for a dispersion liquid near the first electrode 12 and near the second electrode 13 in advance and continuously performing suctioning while a voltage is applied to the first electrode 12 and the second electrode 13. This method is a method using the fact that a content of metallic single-walled carbon nanotubes or a content of semiconducting single-walled carbon nanotubes in the single-walled carbon nanotube dispersion liquid 30 increases near the first electrode 12 or near the second electrode 13.

It is possible to obtain metallic single-walled carbon nanotubes and semiconducting single-walled carbon nanotubes having a higher purity by repeatedly performing putting the fractionated dispersion liquid into the separation tank 11 again and separating the metallic single-walled carbon nanotubes and the semiconducting single-walled carbon nanotubes contained in the single-walled carbon nanotube dispersion liquid 30 using a carrier-free electrophoresis method in the same manner as described above.

According to the single-walled carbon nanotube separation apparatus 10 and the single-walled carbon nanotube separation method using the same in this embodiment, since a content of the metallic single-walled carbon nanotubes or a content of the semiconducting single-walled carbon nanotubes in the single-walled carbon nanotube dispersion liquid 30 increases at the first electrode 12 or the second electrode 13, it is possible to minimize the occurrence of a convection phenomenon in the single-walled carbon nanotube dispersion liquid 30 in the separation tank 11. Thus, the metallic single-walled carbon nanotubes and the semiconducting single-walled carbon nanotubes can be stably separated, and as a result, it is possible to obtain metallic single-walled carbon nanotubes and semiconducting single-walled carbon nanotubes having a higher purity.

Second Exemplary Embodiment (Single-Walled Carbon Nanotube Separation Apparatus)

Figure 2:
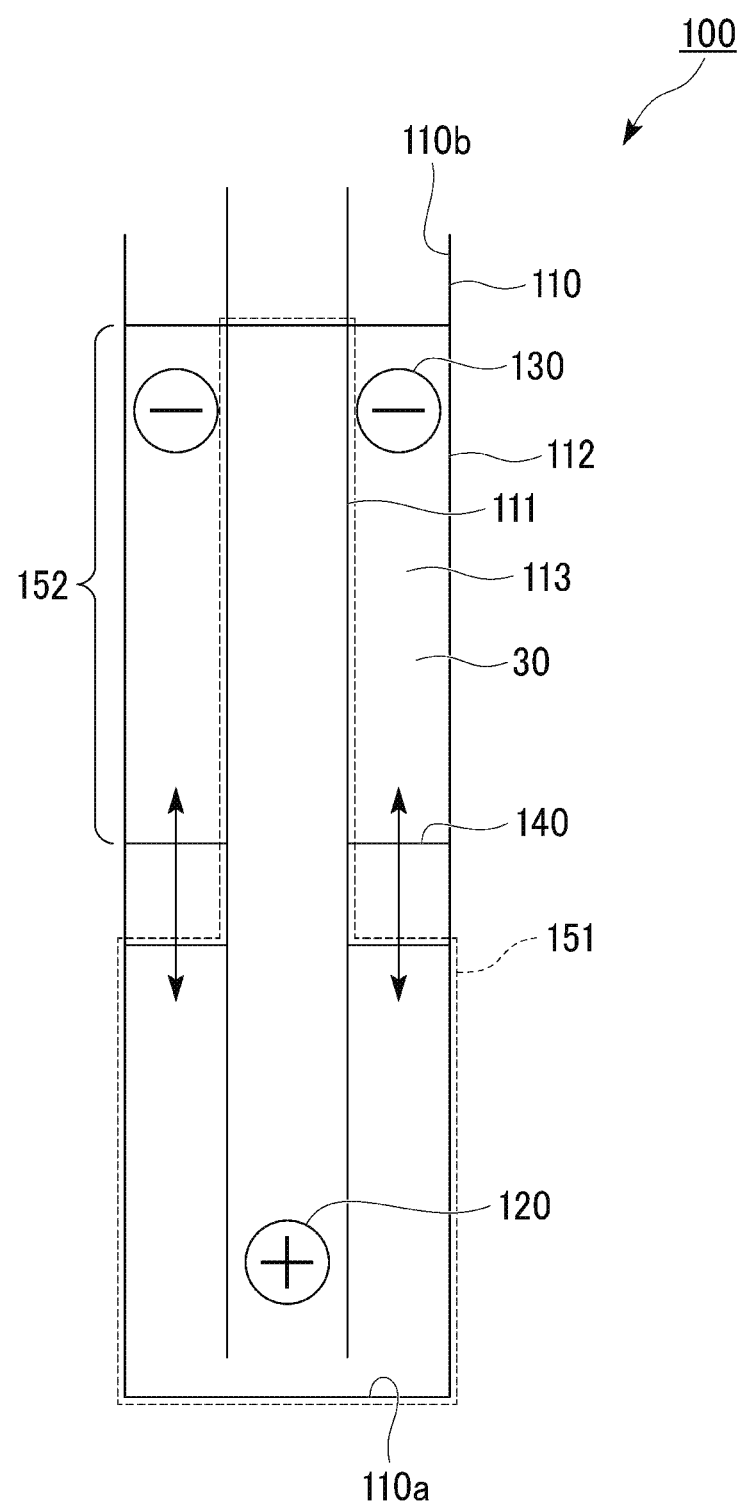
FIG. 2 is a schematic diagram showing a single-walled carbon nanotube separation apparatus according to a second exemplary embodiment.

FIG. 2 is a schematic diagram showing a single-walled carbon nanotube separation apparatus according to this embodiment.

A single-walled carbon nanotube separation apparatus 100 according to this embodiment includes a separation tank 110 which accommodates a single-walled carbon nanotube dispersion liquid 30, a first electrode 120 and a second electrode 130 installed in a separation tank 110, and a partition wall 140 installed between the first electrode 120 and the second electrode 130 in the separation tank 110 and at a lower portion of the separation tank 110 in the height direction thereof.

The separation tank 110 has a double pipe structure including a first pipe 111 and a second pipe 112 that is provided to surround an outer circumference of the first pipe 111. Furthermore, the first pipe 111 and the second pipe 112 communicate with the separation tank 110 on a bottom surface 110a side. Here, communication between the first pipe 111 and the second pipe 112 indicates that the single-walled carbon nanotube dispersion liquid 30 can move between the first pipe 111 and the second pipe 112.

A shape of a cross section perpendicular to a height direction of the first pipe 111 and the second pipe 112 is not particularly limited, but is preferably circular. That is to say, the first pipe 111 and the second pipe 112 are preferably cylindrical. Furthermore, the first pipe 111 and the second pipe 112 are preferably arranged concentrically.

The first electrode 120 is installed in the first pipe 111 below half the height thereof (a region in the first pipe 111 (the separation tank 110) below half the height thereof, a region of the separation tank 110 on the bottom surface 110a side, and an end portion of the separation tank 110 on the bottom surface 110a side in the first pipe 111 in FIG. 2).

The second electrode 130 is installed in a gap 113 between the first pipe 111 and the second pipe 112. Furthermore, the second electrode 130 is installed in the second pipe 112 above half the height thereof (a region in the second pipe 112 (the separation tank 110) above half the height direction thereof, a region of the separation tank 110 opposite to the bottom surface 110a, and an end portion of the separation tank 110 on an opening portion 110b side in the second pipe 112 in FIG. 2).

In the single-walled carbon nanotube separation apparatus 100 in this embodiment, for example, the first electrode 120 is a positive electrode and the second electrode 130 is a negative electrode.

The partition wall 140 is provided in a region below half the height of the separation tank 110 (a region of the separation tank 110 on the bottom surface 110a side) between the first electrode 120 and the second electrode 130 in the separation tank 110, in other words, in a gap 113 between the first pipe 111 and the second pipe 112. Due to this partition wall 140, the inside of the separation tank 110 is partitioned into a first region 151 having the first electrode 120 installed therein (a region in the first pipe 111 and a region below half the height of the second pipe 112 in the separation tank 110) and a second region 152 having the second electrode 130 installed therein (a region above half the height of the second pipe 112 in the separation tank 110).

As the first pipe 111 and the second pipe 112 constituting the separation tank 110, pipes made of the same material as the above-mentioned separation tank 11 is used.

As the first electrode 120 and the second electrode 130, the same electrodes as the above-mentioned first electrode 12 and second electrode 13 may be used.

As the partition wall 140, the same wall as the above-mentioned partition wall 14 is used.

(Single-Walled Carbon Nanotube Separation Method)

Referring to FIG. 2, a single-walled carbon nanotube separation method using the single-walled carbon nanotube separation apparatus 100 will be described and an action of the single-walled carbon nanotube separation apparatus 100 will be described.

First, the single-walled carbon nanotube dispersion liquid 30 is accommodated in the separation tank 110. At this time, the single-walled carbon nanotube dispersion liquid 30 is accommodated in the first pipe 111 and in the second pipe 112 (the gap 113 between the first pipe 111 and the second pipe 112).

Subsequently, in the same manner as in the first exemplary embodiment, the metallic single-walled carbon nanotubes and the semiconducting single-walled carbon nanotubes contained in the single-walled carbon nanotube dispersion liquid 30 are separated using the carrier-free electrophoresis method. Thus, the single-walled carbon nanotube dispersion liquid 30 is separated into two phases, i.e., the dispersion liquid phase A and the dispersion liquid phase B. In this embodiment, the dispersion liquid phase A is formed in the second region 152 via the partition wall 140 and the dispersion liquid phase B is formed in the first region 151 via the partition wall 140.

Subsequently, in the same manner as in the first exemplary embodiment, each of the separated dispersion liquid phase A and dispersion liquid phase B is fractionated.

It is desirable that the fractionated dispersion liquid be repeatedly subjected to an operation of separating the metallic single-walled carbon nanotubes and the semiconducting single-walled carbon nanotubes contained in the single-walled carbon nanotube dispersion liquid 30 in the same manner as in the first exemplary embodiment.

According to the single-walled carbon nanotube separation apparatus 100 and the single-walled carbon nanotube separation method using the same in this embodiment, since a content of the metallic single-walled carbon nanotubes or a content of the semiconducting single-walled carbon nanotubes in the single-walled carbon nanotube dispersion liquid 30 increases near the first electrode 120 or near the second electrode 130, it is possible to minimize the occurrence of a convection phenomenon in the single-walled carbon nanotube dispersion liquid 30 in the separation tank 110. Thus, the metallic single-walled carbon nanotubes and the semiconducting single-walled carbon nanotubes can be stably separated, and as a result, it is possible to obtain metallic single-walled carbon nanotubes and semiconducting single-walled carbon nanotubes having a higher purity.

Third Exemplary Embodiment (Single-Walled Carbon Nanotube Separation Apparatus)

Figure 3:
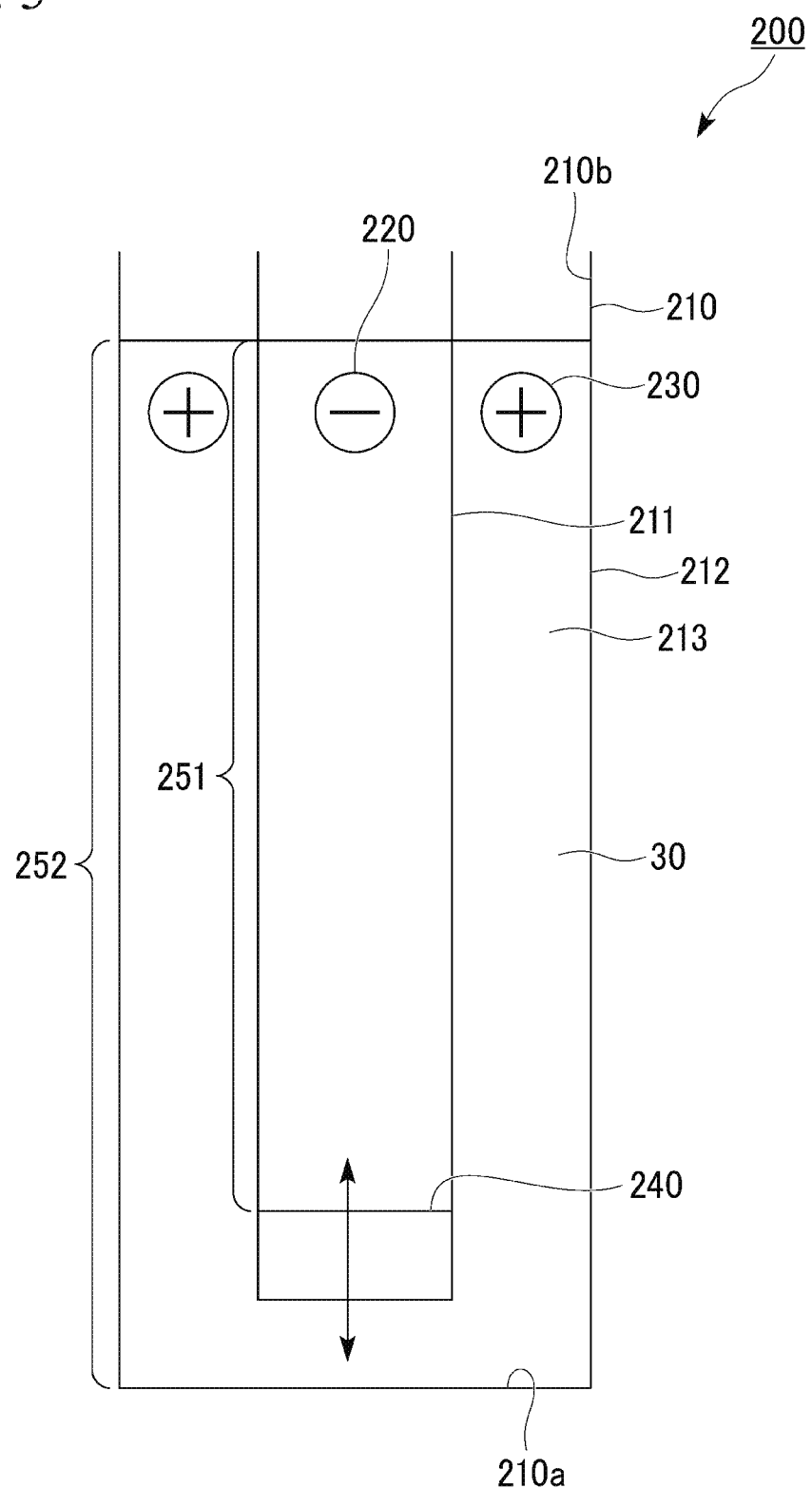
FIG. 3 is a schematic diagram showing a single-walled carbon nanotube separation apparatus according to a third exemplary embodiment.

FIG. 3 is a schematic diagram showing a single-walled carbon nanotube separation apparatus according to this embodiment.

A single-walled carbon nanotube separation apparatus 200 according to this embodiment includes a separation tank 210 which accommodates a single-walled carbon nanotube dispersion liquid 30, a first electrode 220 and a second electrode 230 that are installed in the separation tank 210, and a partition wall 240 installed between the first electrode 220 and the second electrode 230 in the separation tank 210 and in the lower portion of the separation tank 210 in the height direction thereof.

The separation tank 210 has a double pipe structure including a first pipe 211 and a second pipe 212 that is provided to surround an outer circumference of the first pipe 211 in the same manner as the separation tank 110 in the second exemplary embodiment. Furthermore, the first pipe 211 and the second pipe 212 communicates with the separation tank 210 on the bottom surface 210a side.

The first electrode 220 is installed at an upper portion in the first pipe 211 in the height direction thereof (a region in the first pipe 211 (the separation tank 210) above half the height thereof, a region of the separation tank 210 on a side opposite to the bottom surface 210a, and an end portion of the separation tank 210 on the opening portion 210b side in the first pipe 211 in FIG. 3).

The second electrode 230 is installed in a gap 213 between the first pipe 211 and the second pipe 212. Furthermore, the second electrode 230 is installed at an upper portion in the second pipe 212 in the height direction thereof (a region in the second pipe 212 (the separation tank 210) above half the height thereof, a region of the separation tank 210 opposite to the bottom surface 210a, and an end portion of the separation tank 210 on the opening portion 210b side in the second pipe 212 in FIG. 3).

In the single-walled carbon nanotube separation apparatus 200 in this embodiment, for example, the first electrode 220 is a negative electrode and the second electrode 230 is a positive electrode.

The partition wall 240 is provided between the first electrode 220 and the second electrode 230 in the separation tank 210, in other words, at one end portion of the first pipe 211 on the bottom surface 210a side of the separation tank 210 (an end portion of the separation tank 210 on the bottom surface 210a side in the first pipe 211 in FIG. 3). By this partition wall 240, the inside of the separation tank 210 is partitioned into a first region 251 having the first electrode 220 installed therein (a region in the first pipe 211) and a second region 252 having the second electrode 230 installed therein (a region in the second pipe 212).

As the separation tank 210, the same tank as the above-mentioned separation tank 11 is used.

As the first electrode 220 and the second electrode 230, the same electrodes as the above-mentioned first electrode 12 and second electrode 13 is used.

As the partition wall 240, the same wall as the above-mentioned partition wall 14 is used.

(Single-Walled Carbon Nanotube Separation Method)

Referring to FIG. 3, a single-walled carbon nanotube separation method using the single-walled carbon nanotube separation apparatus 200 will be described and an action of the single-walled carbon nanotube separation apparatus 200 will be described.

First, the single-walled carbon nanotube dispersion liquid 30 is accommodated in the separation tank 210. At this time, the single-walled carbon nanotube dispersion liquid 30 is accommodated in the first pipe 211 and in the second pipe 212 (the gap 213 between the first pipe 211 and the second pipe 212).

Subsequently, in the same manner as in the first exemplary embodiment, the metallic single-walled carbon nanotubes and the semiconducting single-walled carbon nanotubes contained in the single-walled carbon nanotube dispersion liquid 30 are separated using the carrier-free electrophoresis method. Thus, the single-walled carbon nanotube dispersion liquid 30 is separated into two phases, i.e., the dispersion liquid phase A and the dispersion liquid phase B. In this embodiment, the dispersion liquid phase A is formed in the first region 251 (in the first pipe 211) via the partition wall 240 and the dispersion liquid phase B is formed in the second region 252 (in the second pipe 212) via the partition wall 240.

Subsequently, in the same manner as in the first exemplary embodiment, each of the separated dispersion liquid phase A and dispersion liquid phase B is fractionated.

It is desirable that the fractionated dispersion liquid be repeatedly subjected to an operation of separating the metallic single-walled carbon nanotubes and the semiconducting single-walled carbon nanotubes contained in the single-walled carbon nanotube dispersion liquid 30 in the same manner as in the first exemplary embodiment.

According to the single-walled carbon nanotube separation apparatus 200 and the single-walled carbon nanotube separation method using the same in this embodiment, since a content of the metallic single-walled carbon nanotubes or a content of the semiconducting single-walled carbon nanotubes in the single-walled carbon nanotube dispersion liquid 30 increases near the first electrode 220 or near the second electrode 230, it is possible to minimize the occurrence of a convection phenomenon in the single-walled carbon nanotube dispersion liquid 30 in the separation tank 210. Thus, the metallic single-walled carbon nanotubes and the semiconducting single-walled carbon nanotubes can be stably separated, and as a result, it is possible to obtain metallic single-walled carbon nanotubes and semiconducting single-walled carbon nanotubes having a higher purity.

Fourth Exemplary Embodiment (Single-Walled Carbon Nanotube Separation Apparatus)

Figure 4:
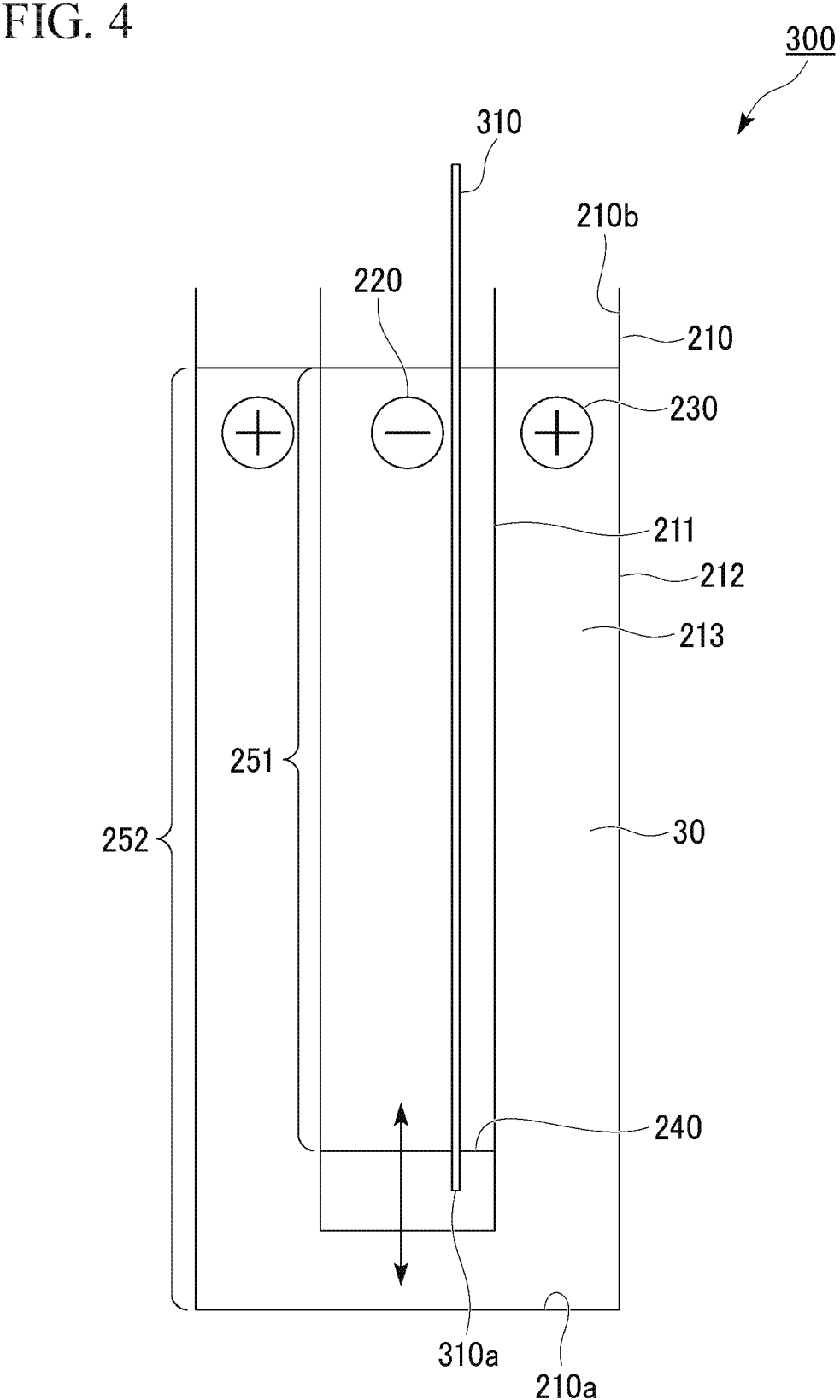
FIG. 4 is a schematic diagram showing a single-walled carbon nanotube separation apparatus according to a fourth exemplary embodiment.

FIG. 4 is a schematic diagram showing a single-walled carbon nanotube separation apparatus according to this embodiment. In FIG. 4, constituent elements that are the same as those of the single-walled carbon nanotube separation apparatus according to the third exemplary embodiment shown in FIG. 3 will be denoted with the same reference numerals and overlapping descriptions thereof will be omitted.

A single-walled carbon nanotube separation apparatus 300 according to this embodiment includes a separation tank 210 which accommodates a single-walled carbon nanotube dispersion liquid 30, a first electrode 220 and a second electrode 230 that are installed in the separation tank 210, a partition wall 240 installed between the first electrode 220 and the second electrode 230 in the separation tank 210 and below the separation tank 210 in a height direction thereof, and a dispersion liquid injection pipe 310 having an injection port 310a for the single-walled carbon nanotube dispersion liquid 30 installed inside the partition wall 240.

In the dispersion liquid injection pipe 310, an injection port 310a serving as one end thereof is installed inside the partition wall 240 and the other end is connected to a dispersion liquid storage tank (not shown) which stores the single-walled carbon nanotube dispersion liquid 30. This dispersion liquid storage tank is installed, for example, outside the single-walled carbon nanotube separation apparatus 300.

A material of the dispersion liquid injection pipe 310 is not particularly limited as long as the material is stable with respect to the single-walled carbon nanotube dispersion liquid 30, and examples thereof include glass, an acrylic resin, and the like.

(Single-Walled Carbon Nanotube Separation Method)

Referring to FIG. 4, a single-walled carbon nanotube separation method using the single-walled carbon nanotube separation apparatus 300 will be described and an action of the single-walled carbon nanotube separation apparatus 300 will be described.

The single-walled carbon nanotube separation method in this embodiment and the single-walled carbon nanotube separation method in the third exemplary embodiment differ in that, in the single-walled carbon nanotube separation method in this embodiment, the single-walled carbon nanotube dispersion liquid 30 is injected into the separation tank 210 through the injection port 310a of the dispersion liquid injection pipe 310 installed inside the partition wall 240.

Thus, by injecting the single-walled carbon nanotube dispersion liquid 30 into the separation tank 210, it is possible to more efficiently separate metallic single-walled carbon nanotubes and semiconducting single-walled carbon nanotubes.

REFERENCE SYMBOLS 10, 100, 200, 300 Single-walled carbon nanotube separation apparatus
11, 110, 210 Separation tank
12, 120, 220 First electrode
13, 130, 230 Second electrode
14, 140, 240 Partition wall
21, 151, 251 First region
22, 152, 252 Second region
30 Single-walled carbon nanotube dispersion liquid
111, 211 First pipe
112, 212 Second pipe
113, 213 Gap
310 Dispersion liquid injection pipe

What is claimed is:

1. A single-walled carbon nanotube separation apparatus comprising:
   a separation tank accommodating a single-walled carbon nanotube dispersion liquid containing: metallic single-walled carbon nanotubes and semiconducting single-walled carbon nanotubes;
   a first electrode and a second electrode that are installed in the separation tank; and
   a partition wall installed between the first electrode and the second electrode in the separation tank and at a lower portion of the separation tank,
   wherein the first electrode is a positive electrode and the second electrode is a negative electrode.

2. The single-walled carbon nanotube separation apparatus according to claim 1, wherein the separation tank has a double pipe structure including: a first pipe; and a second pipe that is provided to surround an outer circumference of the first pipe,
   the first pipe and the second pipe communicate with the separation tank on a bottom surface side,
   the first electrode is installed in the first pipe, and
   the second electrode is installed in a gap between the first pipe and the second pipe.

3. The single-walled carbon nanotube separation apparatus according to claim 2, wherein the partition wall is installed at one end portion of the first pipe on the bottom surface side of the separation tank.

4. The single-walled carbon nanotube separation apparatus according to claim 3, wherein an injection port for the single-walled carbon nanotube dispersion liquid is installed inside the partition wall.

5. A single-walled carbon nanotube separation method using a single-walled carbon nanotube separation apparatus comprising a separation tank, the method comprising:
   accommodating a single-walled carbon nanotube dispersion liquid containing metallic single-walled carbon nanotubes and semiconducting single-walled carbon nanotubes in the separation tank; and
   separating the metallic single-walled carbon nanotubes and semiconducting single-walled carbon nanotubes contained in the single-walled carbon nanotube dispersion liquid using a carrier-free electrophoresis method,
   wherein
   the single-walled carbon nanotube separation apparatus further comprises a first electrode and a second electrode that are installed in the separation tank, and a partition wall installed between the first electrode and the second electrode in the separation tank and at a lower portion of the separation tank, and
   the first electrode is a positive electrode and the second electrode is a negative electrode.

6. A single-walled carbon nanotube separation apparatus comprising:
   a separation tank accommodating a single-walled carbon nanotube dispersion liquid containing: metallic single-walled carbon nanotubes and semiconducting single-walled carbon nanotubes;
   a first electrode and a second electrode that are installed in the separation tank; and
   a partition wall installed between the first electrode and the second electrode in the separation tank and at a lower portion of the separation tank, wherein
   the separation tank has a double pipe structure including a first pipe and a second pipe that is provided to surround an outer circumference of the first pipe,
   the first pipe and the second pipe communicate with the separation tank on a bottom surface side,
   the first electrode is installed in the first pipe, and
   the second electrode is installed in a gap between the first pipe and the second pipe.

* * * * *